Patented May 30, 1950

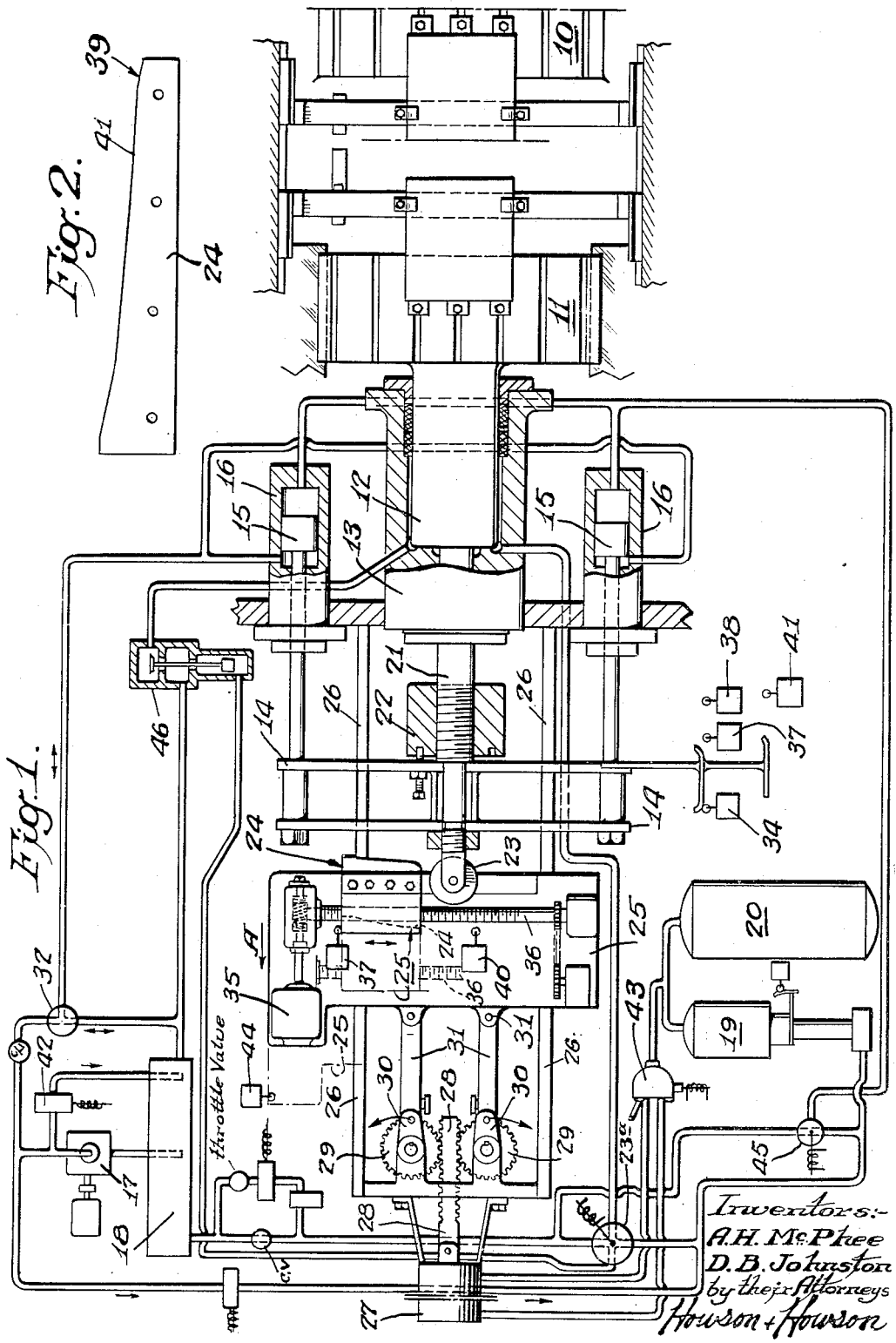

2,509,606

UNITED STATES PATENT OFFICE 2,509,606

CONTROL FOR FLASH-WELDING MACHINES

Alexander H. McPhee, Brooklyn, and David Bruce Johnston, Mamaroneck, N. Y.

Application January 29, 1946, Serial No. 644,094

8 Claims. (Cl. 219—4)

This invention relates to a flash welding machine and more particularly to a heavy duty flash welding machine and to means for controlling the operation thereof.

In such machines the welding operation comprises at least two stages. The preliminary "burn-off" or preheating of the abutting surfaces which are to be welded and an upsetting operation during which the actual weld is formed. Where the weld has a large area the preheating or "burn-off" stage must necessarily be fairly extended and the machine must be kept under extremely close control. Welding machines with which we are familiar have previously employed either of two means of controlling movement of the movable platen of the machine. Where the work is light and the machine small, the movement of the movable platen is controlled both in its preheating cycle and in the upset by a cam. Heavier machines as heretofore constructed have been controlled entirely by hydraulic apparatus either automatically or manually actuated through a follow-up valve. Cam operation is obviously limited to the smaller types of machines being entirely unsuited for use in machines where extreme pressures are necessary. Purely hydraulic operation is objectionable in that a small amount of wear in the follow-up valve or lag therein or a very small amount of air in the hydraulic system will result in an erratic motion of the moving platen with the resultant "sticking" or short-circuiting of the welding current through the members being welded prior to the obtainment of a sufficient degree of heat for proper welding.

An important object of the present invention is the provision of a control for heavy duty flash welding machines of such nature that the movement of the movable platen during the "burn-off" is under absolute control and in which, at the same time provision is made for a rapid and high pressure closing of the movable platen during the welding or upset.

Another object of the invention is to provide a control of this character including what may be termed a preliminary "burn-off" effective prior to the actual "burn-off" period and acting to compensate for inequalities of inaccurate lengths of the members to be welded which might tend to cause "sticking" during the early stages of the "burn-off" and which will eliminate the necessity for extreme accuracy in surfacing of the faces to be welded. This operation is known as "sizing burn-off."

Another object of the invention is the provision in a control of this character of an arrangement whereby, in the event of "sticking," the controls may be actuated to effect a rapid opening of the platens and separation of the members being welded. These and other objects we attain by the control shown in the accompanying drawings in which—

Fig. 1 is a diagrammatic view of layout of a welding machine control constructed in accordance with our invention; and Fig. 2 illustrates a typical form of cam for use in the machine.

Referring now more particularly to the drawings, numerals 11 and 10 designate respectively the movable and fixed platens of a heavy duty flash welding machine. The movable platen has connected thereto a ram 12 in pressure cylinder 13 and connected to this ram and moving therewith as through yoke 14 are the pistons 15 of auxiliary cylinders 16. These cylinders supply the pressure through a liquid system including a pump 17 withdrawing liquid from a sump 18 and discharging either directly to the closing ends of cylinder 16 or to an accumulator 19, including air pressure tank 20. Through control mechanism, hereinafter more fully described, the pressure of accumulator 19 may be imparted simultaneously to the closing ends of cylinders 16 and to the cylinder 13 or to the opening ends of cylinders 16. Yoke 14 is connected to the ram of cylinder 13 by rod 21, this rod bearing an adjustable nut 22 by which means the permissible movement of ram 12 may be adjusted and being provided at its end with a contact roller 23.

Contact roller 23 is adapted for cooaction with a cam 24 which cam is mounted upon a carriage 25 guided by tracks 26 and shiftable upon these tracks from an operative position in which the cam may engage the movable platen 10 through roller 23, rod 21 and ram 12, to an inoperative position suggested by the dotted lines of Fig. 1 in which it is so withdrawn from roller 23 that it may not engage therewith without regard to its position. As at present shown, an air pressure cylinder 27 through a rack 28 operated from the piston thereon rotates gears 29 through which arms 30 are oscillated, these arms being linked to the carriage 25 as at 31 and serving to move the carriage in the direction of the arrow A Fig. 1 at the emergency withdrawal of cam 24 or to shift the same in the opposite direction to restore the carriage to its normal, fully illustrated position. This cylinder as more fully described hereinafter is actuated from pressure tank 20.

Operation of the elements just described is controlled as follows: Assuming the press to be in position illustrated diagrammatically in Fig. 1, pump 17 is in operation and accumulator 19 is charged. Valve 42 is open and permits the entire discharge of pump 17 to return directly to sump 18. The press is fully open and there is no pressure present in the hydraulic controls thereof. The cam is in the returned position. The controls of the press are preferably electrical and have been generally indicated by various electrically operated valves and limit switches hereinafter more particularly referred to.

In starting the press, and performing what may be called closing thereof, during which the press is shifted from its full open position to a position where the ends of the work are brought into position for welding, valve 42 is shifted making pressure available to valve 32 and valve 32 normally blocked at all ports is positioned to admit fluid pressure from the pump to the closing ends of cylinders 16. The press moves forward on its closing stroke until limit switch 38 returns valve 32 to normal position. During this time the cylinder 13 is filled by gravity from sump 18 through filling check valve 46. During this movement a limit switch 34 controlling operation of motor 35, operating screw 36 by means of which the cam 24 is actuated, is returned to normal position and a second limit switch 37 is actuated, energizing motor 35 and advancing cam 24 at full speed. During this time the movement of movable platen 10 continues and a further limit switch 38 is actuated. This switch serves to return valves 32 and 42 to their normal positions in which, as heretofore described, the pump pressure is diverted to the sump 18 thus stopping the press. Continued forward movement of cam 24 brings it into contact with the roller 23 and the engagement of the cam and roller through an incline 39 on the cam advances the platen 10 to a short distance, as for example one quarter inch and causes the cam to actuate a limit switch 40 checking operation thereof.

The machine is now positioned for the welding operation and when this is initiated, forward movement of cam 24 continues, the cam moving forward at adjusted speed and closing the press. As more clearly shown in Fig. 2 the cam, adjacent to incline 39, preferably includes a very slight slope 41 causing a slow forward operation following the application of welding current and permitting the "sizing burn-off" hereinbefore referred to, following which the cam feeds the platen 10 forward at an adjusted speed determined particularly for the work at hand (variations in operation will require varied cam structures) to complete the "burn-off" operation. During this "burn-off" operation, if it be so desired, the intensity of welding voltage may be changed as the platen 10 advances to regulate the heat as desired.

As the movement of the cam is completed, movement of the platen closes a limit switch 41 thereby actuating valves 23a and 32. Valve 23a directs accumulator pressure from the accumulator 19 to cylinder 13 thereby causing the press to close rapidly at high pressure and effecting the upset stroke. Valve 23a also exhausts the pressure from filling check valve 46 permitting it to close and thereby preventing the escape of pressure from cylinder 13. Valve 32 admits pressure to closing side of cylinders 16.

As previously noted, it sometimes occurs, despite close calculations and careful preparation that "sticking" occurs during the "burn-off" i. e. during that period when the advance of platen 10 is under control of cam 24. Accordingly, during this period the emergency pull back or press opening apparatus is made effective. In event of "sticking," the operator activates a circuit through which a valve 43 is shifted to deflect air pressure from accumulator tank 29 from the inner to the outer end of cylinder 27. This results in a retraction of carriage 25 thereby withdrawing the cam to its inoperative position, it being recalled that the cam, during this period, will be in alinement with the roller and arranged in the effective path of movement of this roller during any rate of open movement of platen 10. As the carriage 25 approaches its withdrawn position at which the cam 24, regardless of its position, will be clear of movement with roller 23 in its extreme left hand position, (Fig. 1) a limit switch or other control indicated at 44 actuates valve 32 to connect the left hand ends of cylinders 16 with sump 18 and at the same time actuates a valve 45 by means of which accumulator pressure is admitted to the right hand ends of cylinder 16 thereby opening the press.

In addition to the above, provision is made for returning the cam automatically after the normal upset stroke and for returning the movable platen to the open position so that the cycle may be repeated.

Also, all movements of the press and cam may be operated individually and separately so that adjustments can be made. During all operations interlocks are provided for preventing the interference of parts which occupy the same space at different times during the normal welding cycle.

It will be obvious from the foregoing that by use of a press control constructed in accordance with our invention the usual safety factors may be maintained while at the same time enabling positive and accurate control of both the "burn-off" and upsetting cycles of the weld-forming operation. It will also be obvious that the present illustration is purely diagrammatic and capable of considerable variation in actual practice. We do not, accordingly, wish to be understood as limiting ourselves to the arrangement shown except as hereinafter explained.

We claim:

1. In a flash welding machine, a press having fixed and movable platens, mechanical cam means to close the platens during the "burn-off" period of a welding operation, and hydraulic means effective after a predetermined closing movement of the platens by the cam to effect an upset at the weld.

2. In a flash welding machine, a press having fixed and movable platens, mechanical cam means to close the platens during the "burn-off" period of a welding operation, and hydraulic means effective after a predetermind closing movement of the platens by the cam to effect an upset at the weld, said cam means having two positions in one of which it may be engaged with the movable platen to move the same and in the other of which it is unengageable therewith, and means for moving said cam to the last named position and thereafter actuating said hydraulic means to open said platens.

3. In a flash welding machine, a press having fixed and movable platens adapted to receive members to be weld-connected, hydraulic means to shift said platens to bring said members into engagement, mechanical cam means to effect engagement of the members during the "burn-off" period of the welding operation, and means to actuate said hydraulic means effective only after a predetermined closing movement of the platens by the cam means for upsetting the members at the weld.

4. In a flash welding machine, a press having fixed and movable platens adapted to receive members to be weld-connected, hydraulic means to shift said platens to bring said members into engagement, mechanical cam means to effect engagement of the members during a "burn-off" period of the welding operation, and means to actuate said hydraulic means effective only after a predetermined closing movement of the platens by the first named means for upsetting the members at the weld, said cam means having two positions in one of which it may be engaged with the movable platen to move the same and in the other of which it is unengageable therewith, and means for moving said cam to the last named position and thereafter actuating said hydraulic means to open said platens.

5. In a flash welding machine, a press including fixed and movable platens having open and closed positions, means to close the platens, cam means to further close the platens during "burn-off" of elements to be welded mounted thereon, means to apply pressure to upset said elements, and means operable at will during said "burn-off" for opening said press.

6. In a flash welding machine, a press including fixed and movable platens having open and closed positions, means to close the platens, cam means to further close the platens during "burn-off" of elements to be welded mounted thereon, hydraulic means to apply pressure to upset said elements, means operable at will during said "burn-off" for opening said press, said cam means having two positions in one of which it may be engaged with the movable platen to move the same and in the other of which it is unengageable therewith, and means for moving said cam to the last named position and thereafter actuating said hydraulic means to open said platens.

7. In a flash welding machine, a press having fixed and movable platens, means including a motor-driven cam for actuating the movable platen during the "burn-off" period of a welding operation, and hydraulic means rendered operative at the completion of said period for actuating the movable platen rapidly and under high pressure to effect an upset at the weld.

8. In a flash welding machine, a press having fixed and movable platens, a pressure cylinder, a ram in said cylinder connected to the movable platen, a rod extending from said ram to the exterior of said cylinder, hydraulic means for actuating said rod to close said press, mechanical cam means for actuating said rod so as to move the movable platen during the "burn-off" period of a welding operation, and means for actuating said ram hydraulically to effect an upset at the weld.

ALEXANDER H. McPHEE.
DAVID BRUCE JOHNSTON.

REFERENCES CITED

The following references are of record in the file of this patent:

UNITED STATES PATENTS

| Number | Name | Date |
| --- | --- | --- |
| 1,957,759 | Coates | May 8, 1934 |
| 2,015,914 | Weightman | Oct. 1, 1935 |
| 2,085,049 | Spire | June 29, 1937 |
| 2,409,850 | Hackett et al. | Oct. 22, 1946 |